(12) United States Patent
Kim et al.

(10) Patent No.: US 9,687,129 B2
(45) Date of Patent: Jun. 27, 2017

(54) ROBOT CLEANER

(71) Applicant: LG ELECTRONICS INC., Seoul (KR)

(72) Inventors: Hwang Kim, Seoul (KR); Jongsu Kim, Seoul (KR); Sungil Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/955,940

(22) Filed: Dec. 1, 2015

(65) Prior Publication Data

US 2016/0150931 A1     Jun. 2, 2016

(30) Foreign Application Priority Data

Dec. 1, 2014 (KR) .................. 10-2014-0169996

(51) Int. Cl.
*A47L 9/10* (2006.01)
*A47L 9/16* (2006.01)
(Continued)

(52) U.S. Cl.
CPC ............. *A47L 9/1683* (2013.01); *A47L 9/108* (2013.01); *A47L 9/16* (2013.01); *A47L 11/4063* (2013.01);
(Continued)

(58) Field of Classification Search
CPC .......... A47L 9/1683; A47L 9/16; A47L 9/108; A47L 11/4063; A47L 2201/00; A47L 2201/04; A47L 9/10; B01D 45/16
See application file for complete search history.

(56) References Cited

U.S. PATENT DOCUMENTS

2009/0229074 A1*  9/2009  Oh .................. A47L 9/1641
                                                  15/353
2010/0263161 A1* 10/2010  Lee ................. A47L 5/362
                                                  15/347
(Continued)

FOREIGN PATENT DOCUMENTS

JP        H08-280592        10/1996
JP        2002-298929       10/2002
(Continued)

OTHER PUBLICATIONS

Korean Office Action dated Oct. 30, 2015 issued in Application No. 10-2014-0169996.
(Continued)

*Primary Examiner* — David Redding
(74) *Attorney, Agent, or Firm* — KED & Associates, LLP

(57) ABSTRACT

A robot cleaner includes: a suction module configured to suck dust-included air; a cyclone module configured to separate dust from the dust-included air sucked through the suction module, and having a dust discharge opening; a first air flow guide and a second air flow guide spaced apart from each other, and connecting the suction unit to the cyclone unit; a dust box detachably coupled to the dust discharge opening of the cyclone module, and provided between the first and second air flow guides; a drive module provided between the first and second air flow guides; and a dust compressor provided in the dust box, and mechanically coupled to the drive module when the dust box is mounted to the cyclone module, and formed to be rotatable bi-directionally based on a driving force from the drive module such that dust collected in the dust box is pressed to have a deceased volume.

15 Claims, 14 Drawing Sheets

(51) Int. Cl.
  *B01D 45/16* (2006.01)
  *A47L 11/40* (2006.01)
(52) U.S. Cl.
  CPC .......... *B01D 45/16* (2013.01); *A47L 2201/00* (2013.01); *A47L 2201/04* (2013.01)

(56) References Cited

U.S. PATENT DOCUMENTS

| 2011/0162157 A1 | 7/2011 | Dooley et al. |
| 2011/0202175 A1 | 8/2011 | Romanov et al. |
| 2012/0167917 A1 | 7/2012 | Gilbert, Jr. |
| 2014/0130290 A1 | 5/2014 | Jang et al. |
| 2014/0182627 A1 | 7/2014 | Williams et al. |

FOREIGN PATENT DOCUMENTS

| JP | 2006-231028 | 9/2006 |
| JP | 2007-520323 | 7/2007 |
| KR | 10-2007-0064997 A | 6/2007 |
| KR | 10-0809773 B1 | 3/2008 |
| KR | 2008-0022342 | 3/2008 |
| KR | 10-2010-0108839 A | 10/2010 |
| KR | 10-0996531 B1 | 11/2010 |
| KR | 10-10309796 B1 | 9/2013 |
| WO | WO 2011/074716 A1 | 6/2011 |
| WO | WO 2013/171462 A2 | 11/2013 |

OTHER PUBLICATIONS

European Search Report dated May 13, 2015 issued in Application No. 15195696.8.
European Search Report dated Apr. 15, 2016 issued in Application No. 15195685.1.
U.S. Notice of Allowance dated Dec. 14, 2016 issued in co-pending U.S. Appl. No. 14/952,760.
U.S. Appl. No. 14/952,760, filed Nov. 25, 2015.
U.S. Appl. No. 14/956,205, filed Dec. 1, 2015.

* cited by examiner

ROBOT CLEANER

CROSS-REFERENCE TO RELATED APPLICATION

Pursuant to 35 U.S.C. §119(a), this application claims the benefit of earlier filing date and right of priority to Korean Application No. 10-2014-0169996, filed on Dec. 1, 2014, the contents of which is incorporated by reference herein in its entirety.

BACKGROUND

1. Field

The present disclosure relates to a robot cleaner.

2. Background

Generally, a robot has been developed for an industrial use, and has managed some parts of factory automation. As the robot is applied to various fields recently, not only medical robots and space robots, but also home robots are being developed. A representative of the home robot is a robot cleaner, a kind of home electronic appliance capable of performing a cleaning operation by sucking dust on a floor (including foreign materials) while autonomously moving on a predetermined region. Such a robot cleaner is provided with a chargeable battery, and is provided with an obstacle sensor for avoiding an obstacle while moving.

The robot cleaner is configured to suck dust-contained air, to filter dust from the dust-contained air by a filter, and to discharge filtered air to the outside. The filtered dust is accumulated in a dust box. The dust may scatter by flow of air generated when the robot cleaner is driven, thereby lowering cleaning performance. The dust may also scatter when discharged from the dust box, thereby causing discomfort to a user.

BRIEF DESCRIPTION OF THE DRAWINGS

The embodiments will be described in detail with reference to the following drawings in which like reference numerals refer to like elements wherein.

DETAILED DESCRIPTION

Figure 1:
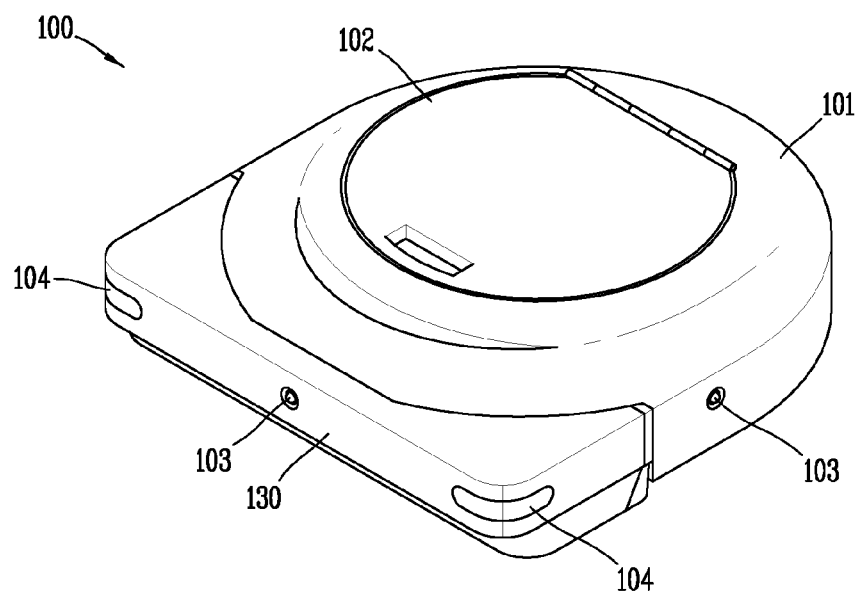
FIG. 1 is a perspective view of a robot cleaner according to the present disclosure.
Figure 2:
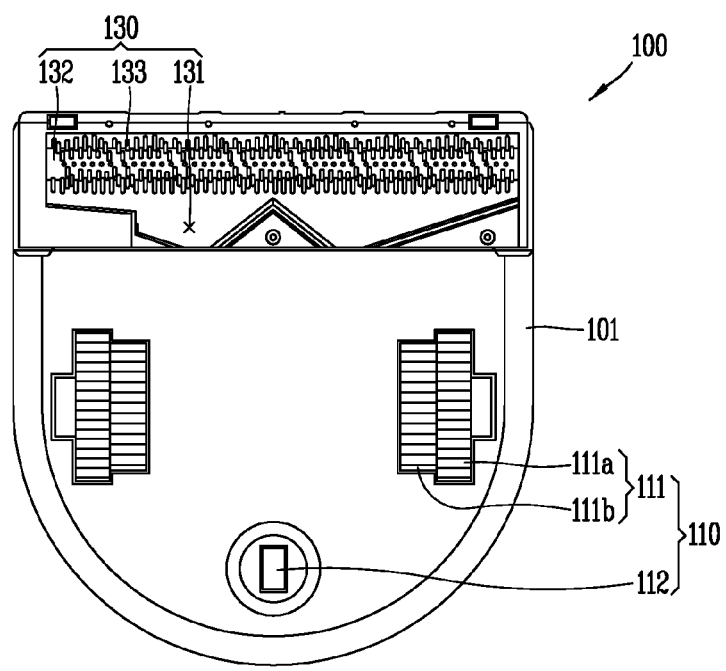
FIG. 2 is a bottom view of the robot cleaner of FIG. 1.

Referring to FIGS. 1 and 2, the robot cleaner 100 performs a function to clean a floor by sucking dust (including foreign materials) on the floor, while autonomously moving on a predetermined region. The robot cleaner 100 includes a cleaner body 101 for performing a moving function, a controller (not shown) and a moving unit 110, e.g., a motorized wheel. The cleaner body 101 is configured to accommodate components therein, and to move on a floor by the moving unit 110. The controller for controlling an operation of the robot cleaner 100, a battery (not shown) for supplying power to the robot cleaner 100, etc. may be mounted to the cleaner body 101.

The moving unit 110 is configured to move (or rotate) the cleaner body 101 back and forth or right and left, and is provided with main wheels 111 and a supplementary wheel 112. The main wheels 111 are provided at two sides of the cleaner body 101, are configured to be rotatable to one direction or another direction according to a control signal. The main wheels 111 may be configured to be independently driven. For instance, each of the main wheels 111 may be driven by a different motor.

Each of the main wheels 111 may be composed of wheels 111a and 111b having different radiuses with respect to a rotation shaft. Under such a configuration, in a case where the main wheel 111 moves up on an obstacle such as a bump, at least one of the wheels 111a and 111b contacts the obstacle. This can prevent idling of the main wheel 111. The supplementary wheel 112 is configured to support the cleaner body 101 together with the main wheels 111, and to supplement movement of the cleaner body by the main wheels 111.

Figure 3:
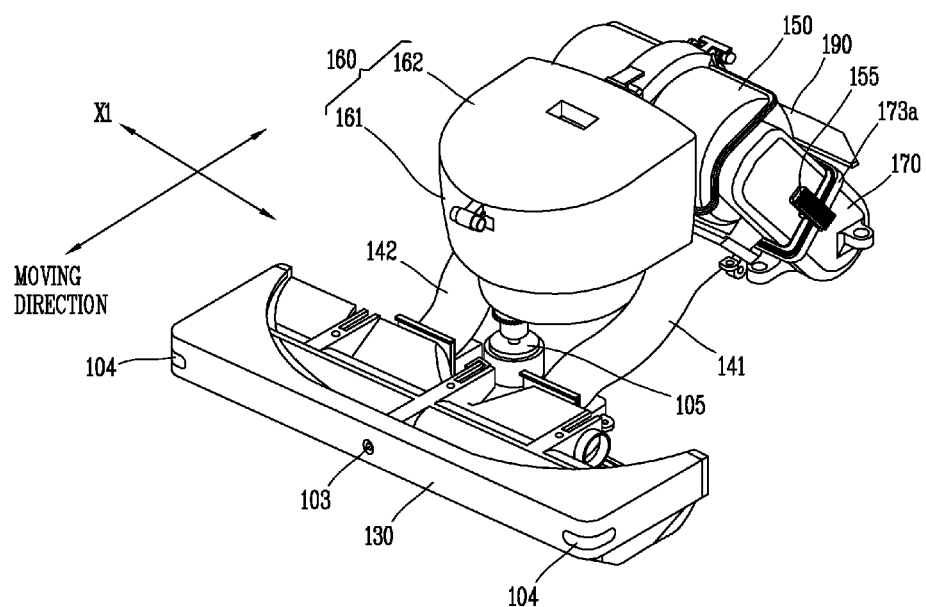
FIG. 3 illustrates main components inside the robot cleaner of FIG. 1.
Figure 4:
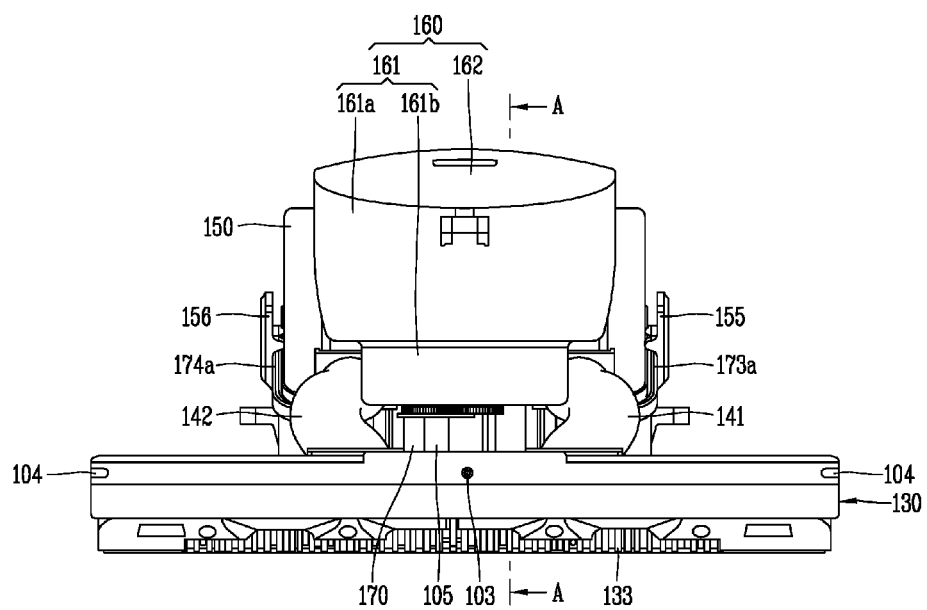
FIG. 4 is a front view of the robot cleaner of FIG. 3.
Figure 5:
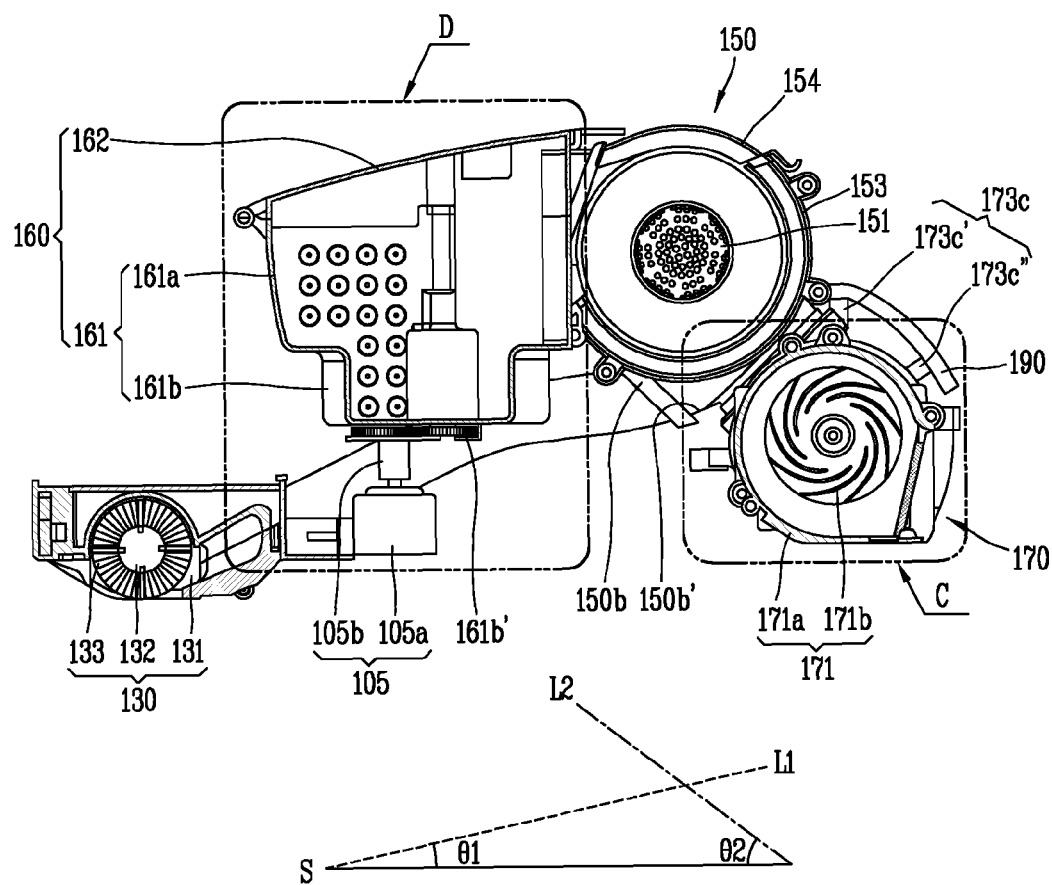
FIG. 5 is a sectional view taken along line 'A-A' in FIG. 4.

Referring to FIGS. 3 to 5, the robot cleaner 100 includes a suction unit or module 130, a first guiding member 141 (or first air flow guide), a second guiding member 142 (or second air flow guide), a cyclone unit or module 150 and a fan unit or module 170. The suction unit or module 130 is provided at a bottom portion of the cleaner body 101, and is configured to suck dust or dirt contained air (dirty air) on a floor by the fan unit 170. The suction unit 130 may be arranged at a front side of the cleaner body 101, and may be detachably mounted to the cleaner body 101. The position of the suction unit 130 is related to a moving direction of the robot cleaner 100 when the robot cleaner 100 is normally operated.

An obstacle sensor 103 electrically connected to the controller and configured to sense an obstacle while the robot cleaner 100 moves and a damper 104 formed of an elastic material and configured to absorb a shock when the robot cleaner 100 collides with an obstacle may be provided at the suction unit 130. The obstacle sensor 103 and the damper 104 may be provided at the cleaner body 101.

Referring to FIG. 5, the suction unit 130 includes a suction opening 131, a roller 132 and a brush 133. The suction opening 131 may be formed to extend in a lengthwise direction of the suction unit 130. The roller 132 is rotatably installed at the suction opening 131, and the brush 133 is mounted to an outer circumferential surface of the roller 132. The brush 133 is configured to sweep up dust on a floor to the suction opening 131. The brush 133 may be formed of various materials including a fibrous material, an elastic material, etc.

The first guiding member 141 and the second guiding member 142 may be provided between the suction unit 130 and the cyclone unit 150, thereby connecting the suction unit 130 and the cyclone unit 150 to each other. The first guiding member 141 and the second guiding member 142 are spaced from each other. One ends of the first and second guiding members 141 and 142 coupled to the suction unit 130 may be fixed to the cleaner body 101.

Air sucked through the suction unit 130 is introduced into the cyclone unit 150 in a diverged manner, through the first and second guiding members 141 and 142. Such a configuration is advantageous in that air sucking efficiency is enhanced or improved, than in a case where a single guiding member is provided.

Figure 7A:
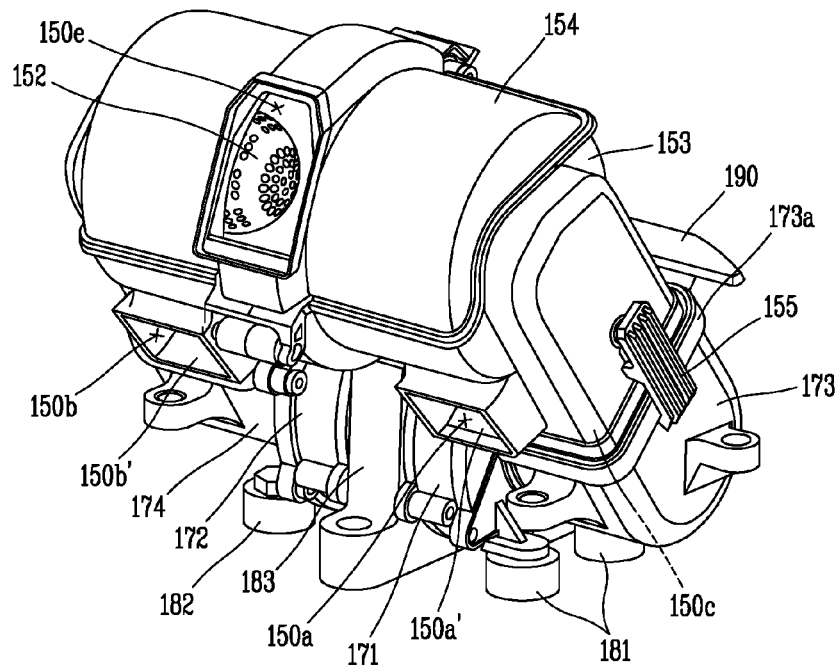
FIG. 7A is a perspective view of the cyclone unit and the fan unit of FIG. 6.

The first and second guiding members 141 and 142 may be disposed to be upward inclined toward the cyclone unit 150, so as to extend from the suction unit 130 toward the cyclone unit 150 (specifically, a first suction opening 150a and a second suction opening 150b shown in FIG. 7A), where the cyclone unit 150 is arranged at a rear upper side of the suction unit 130. The cyclone unit 150 may be provided with a cylindrical inner circumferential surface, and may be long-formed along a second direction (X1). The cyclone unit 150 may have an approximate cylindrical shape. The second direction (X1) may be a direction perpendicular to a moving (or first) direction of the robot cleaner 100.

The cyclone unit 150 is configured to filter at least one of dust or dirt (hereinafter, collectively referred to as "dust") from air sucked thereto through the suction unit 130. Air sucked into the cyclone unit 150 is rotated along an inner circumferential surface of the cyclone unit 150. During this process, dust is collected to a dust box or a storage chamber 160 communicated with a dust discharge opening 150e (FIG. 7A), and dirty air is introduced into a first cyclone 151 and a second cyclone 152.

The dust discharge opening 150e is formed at a front side of the cyclone unit 150. The dust discharge opening 150e may be formed between the first suction opening 150a and the second suction opening 150b (or between the first cyclone 151 and the second cyclone 152), i.e., at a central portion of the cyclone unit 150. Under such a structure, dust included in air introduced into two sides of the cyclone unit 150 through the first and second suction openings 150a and 150b, rotates along an inner circumferential surface of the cyclone unit 150, toward a central part from an end part of the cyclone unit 150. The dust is collected or blown to the dust box 160 through the dust discharge opening 150e.

The dust box 160 is connected to the cyclone unit 150, and is configured to collect dust filtered by the cyclone unit 150. In this embodiment, the dust box 160 is disposed between the suction unit 130 and the cyclone unit 150. The dust box 160 is detachably mounted to the cyclone unit 150 so as to be separable from the cleaner body 101. When a removable cover 102 coupled to the cleaner body 101 is opened, the dust box 160 may be in a separable state by being exposed to the outside. The dust box 160 may be configured to be exposed to the outside, thereby forming the appearance of the robot cleaner 100 together with the cleaner body 101. In such a case, a user can check the amount of dust accumulated in the dust box 160 without opening the cover 102.

The dust box 160 may include a dust box body or a dust storage chamber 161 and a dust box cover 162. The dust box body 161 forms a space for collecting dust filtered by the cyclone unit 150, and the dust box cover 162 is coupled to the dust box body 161 so as to open and close an opening of the dust box body 161. For instance, the dust box cover 162 may be configured to open and close the opening of the dust box body 161 by being hinge-coupled to the dust box body 161. The dust discharge opening 150e may be provided at the dust box body 161. However, the present disclosure is not limited to this. The dust discharge opening 150e may be also formed at the dust box cover 162 according to a modified design.

As aforementioned, the dust box 160 connected to the cyclone unit 150 may be formed to have a predetermined depth, since the cyclone unit 150 is arranged at an upper side of the suction unit 130. For efficient spatial arrangement, at least part of the dust box 160 may be accommodated in a space between the first guiding member 141 and the second guiding member 142.

In this embodiment, the dust box body 161 includes a first portion 161a and a second portion 161b having different sectional areas. The first portion 161a may communicate with the dust discharge opening 150e, and at least part of the first portion 161a may be disposed on the first and second guiding members 141 and 142. As shown in FIG. 4, in this embodiment, two sides of the first portion 161a are disposed on the first and second guiding members 141 and 142.

The second portion 161b is formed to extend to a lower side of the first portion 161a, and to have a smaller sectional area than the first portion 161a. At least part of the second portion 161b is accommodated in a space between the first and second guiding members 141 and 142. The first and second guiding members 141 and 142 may be formed such that at least part thereof is bent to enclose or support the second portion 161b at two sides.

Based on such a structure, dust collected into the dust box 160 is firstly accumulated in the second portion 161b. In a modified embodiment, an inclined portion or wall (not shown), inclined toward the second portion 161b so that dust can move to the second portion 161b, may be provided between the first portion 161a and the second portion 161b.

The dust box cover 162 may be arranged to be inclined so that at least part thereof can face the dust discharge opening 150e. Based on such a structure, dust introduced into the dust box 160 through the dust discharge opening 150e can the dust box cover 162 to be collected in the dust box body 161 (mainly, the second portion 161b).

The fan unit or module 170 is connected to the cyclone unit 150. The fan unit 170 includes a motor 175 configured to generate a driving or suction force, and a first fan part 171 and a second fan part 172 connected to two sides of the motor part 175 and configured to generate a suction force. A detailed structure of the fan unit 10 will be explained later (see, e.g., FIG. 9A).

The fan unit 170 may be fixed to the cleaner body 101, and may be provided at a rear lower side of the cyclone unit 150. For such an arrangement, the cyclone unit 150 is coupled onto the fan unit 170 (specifically, a first communication member 173 and a second communication member 174), thereby being spaced from an inner bottom surface of the cleaner body 101.

As shown in FIG. 5, an arbitrary line (L1), which connects two ends of the first guiding member 141 or the second guiding member 142 to each other, has an inclination angle (θ1), from an inner bottom surface (S) of the cleaner body 101. An arbitrary line (L2), which connects the cyclone unit 150 and the fan unit 170 to each other, has an inclination angle (θ2), from the inner bottom surface (S) of the cleaner body 101. As such inclination angles (θ1 and θ2) are controlled, a volume of the dust box 160 may be variously changed.

Figure 6:
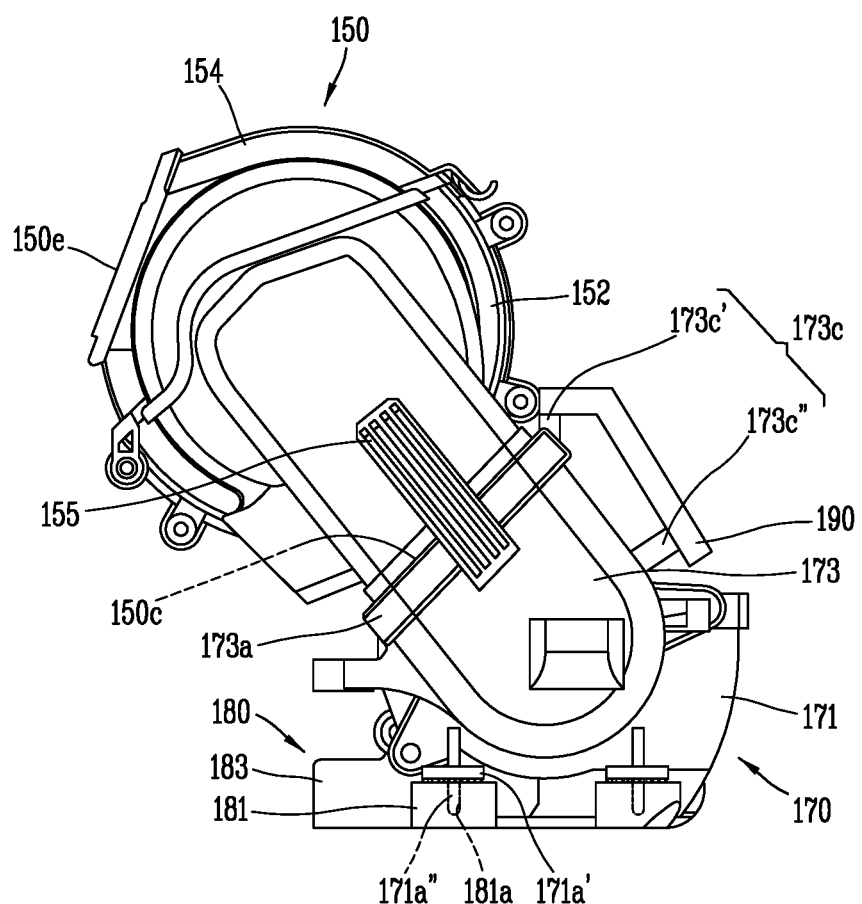
FIG. 6 is a side sectional view illustrating a cyclone unit and a fan unit separated from the robot cleaner of FIG. 3.

FIG. 6 is a side sectional view illustrating the cyclone unit 150 and the fan unit 170 separated from the robot cleaner 100 of FIG. 3. FIG. 7A is a perspective view of the cyclone unit 150 and the fan unit 170 of FIG. 6. The FIG. 7B illustrates a state where a second case 154 of the cyclone unit 150 of FIG. 7A has been removed.

Figure 7B:
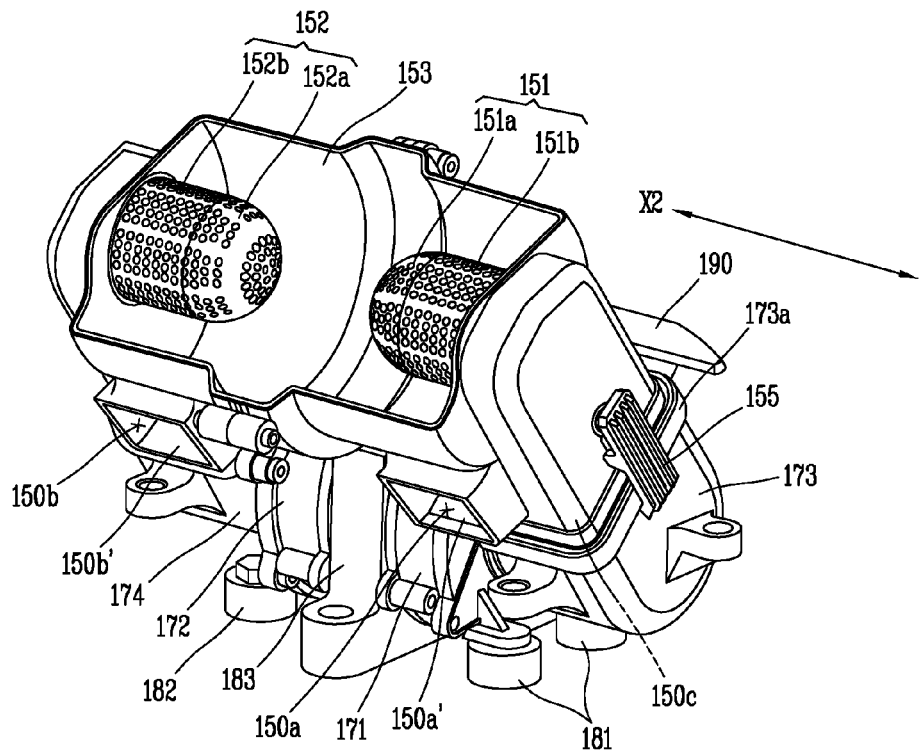
FIG. 7B illustrates a state where a second case of the cyclone unit of FIG. 7A has been removed.

Referring to FIGS. 6 to 7B together with the aforementioned figures, the cyclone unit 150 is provided with the first suction opening 150a communicated with the first guiding member 141, and the second suction opening 150b communicated with the second guiding member 142. The first suction opening 150a and the second suction opening 150b may be formed at two sides of the cyclone unit 150 such that air introduced into the cyclone unit 150 through the first suction opening 150a and the second suction opening 150b rotates along an inner circumferential surface of the cyclone unit 150, toward a central part from an end part of the cyclone unit 150.

The cyclone unit 150 may further include a first suction guide 150a' and a second suction guide 150b' configured to guide air sucked to the cyclone unit 150 through the first suction opening 150a and the second suction opening 150b to an inner circumferential surface of the cyclone unit 150, respectively. The first suction guide 150a' is formed at the first suction opening 150a toward an inner circumferential surface of the cyclone unit 150, and the second suction guide 150b' is formed at the second suction opening 150b toward an inner circumferential surface of the cyclone unit 150.

The cyclone unit 150 is provided therein with the first cyclone 151 and the second cyclone 152 such that air and dust are introduced into the first cyclone 151 and the second cyclone 152. The first cyclone 151 has a structure that an air passing hole 151b is formed at a protruding member 151a having a hollow inner space, and the second cyclone 152 has a structure that an air passing hole 152b is formed at a protruding member 152a having a hollow inner space. Dust of prescribed size cannot pass through the air passing holes 151b and 152b, whereas air (with fine dust smaller than the prescribed size) can pass through the air passing holes 151b and 152b to flow into the hollow inner spaces of the protruding members 151a and 152a.

As shown, the first cyclone 151 may be arranged close to the first suction opening 150a, and the second cyclone 152 may be arranged close to the second suction opening 150b. Under such a structure, air and dust sucked into the cyclone unit 150 through the first suction opening 150a is mainly introduced into the first cyclone 151, and air and dust sucked into the cyclone unit 150 through the second suction opening 150b is mainly introduced into the second cyclone 152. Dust may be efficiently filtered from the sucked air, and the dust-filtered air can be more efficiently discharged from the cyclone unit 150.

The first and second cyclones 151 and 152 may be provided at two ends of the cyclone unit 150 in a facing manner. In this case, the first and second cyclones 151 and 152 may be formed to protrude from the same axis (X2). The axis (X2) may be perpendicular to a moving direction (forward or backward direction) of the robot cleaner 100. The axis (X2) may be identical to the aforementioned a second direction (X1).

The first and second cyclones 151 and 152 may be arranged at central regions of two end portions of the cyclone unit 150 so as to have a preset separating distance from an inner circumferential surface of the cyclone unit 150. Under such a structure, dust can rotate along an inner circumferential surface of the cyclone unit 150, and dust-filtered air can be mainly introduced into the first and second cyclones 151 and 152.

Figure 8:
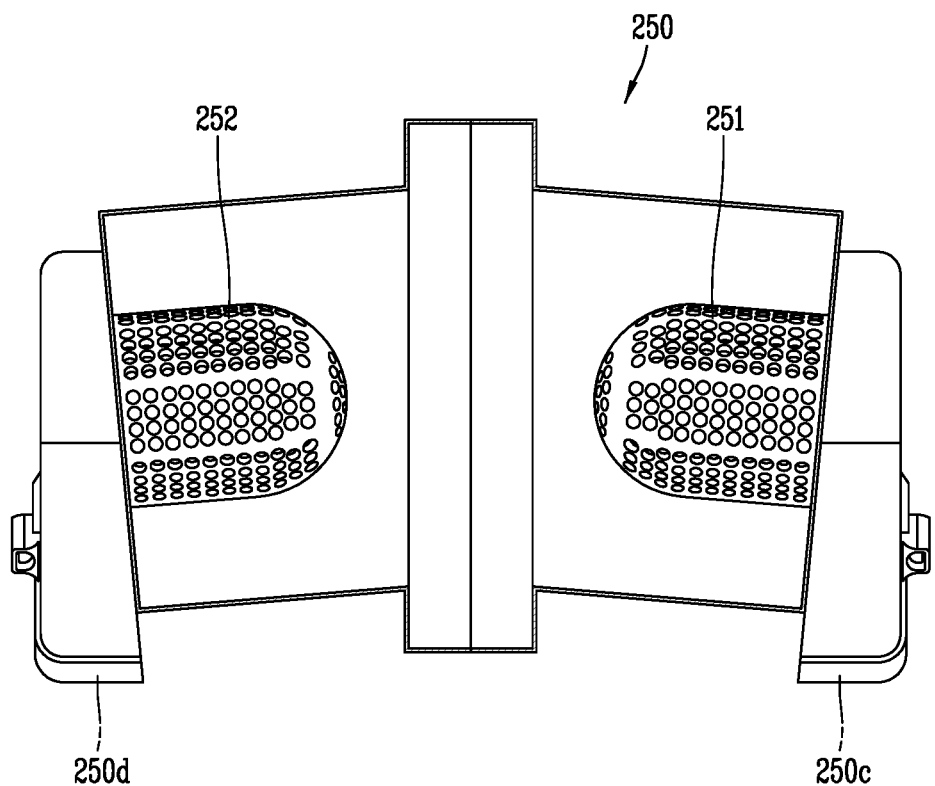
FIG. 8 illustrates a modification example of the cyclone unit of FIG. 7A.

Referring to FIG. 8 illustrating a modification example of the cyclone unit 150 of FIG. 7A, a cyclone unit 250 may be configured so that air which has passed through first and second suction openings (not shown) can be introduced toward a central part of the cyclone unit 250. Under such a structure, air introduced into the cyclone unit 250 can easily rotate toward a central part of the cyclone unit 250 from an end part of the cyclone unit 250.

In the drawings, the cyclone unit 250 is arranged so that a region for accommodating a first cyclone 251 and a region for accommodating a second cyclone 252 have a preset angle therebetween. The preset angle viewed from a front side may be 180° or less.

The first and second suction openings may be formed toward a central part of the cyclone unit 250 such that air is introduced into the central part of the cyclone unit 250. The first and second suction guides (not shown) aforementioned with reference to the aforementioned embodiment may be formed to extend toward the central part of the cyclone unit 250.

Referring back to FIGS. 6 and 7B, the cyclone unit 150 may include a first case 153 and a second case 154. The first case 153 is provided with the first and second suction openings 150a and 150b and the first and second cyclones 151 and 152, and is configured to be coupled to the first and second guiding members 141 and 142. The second case 154 is provided with a dust discharge opening 150, and is removably coupled to the first case 153. For example, the second case 154 may be hinge-coupled to the first case 153, and may be configured to open and close the first case 153 by being rotated.

Under such a configuration, as the second case 154 is separated from the first case 153 or rotated, and inside of the cyclone unit 150 may be exposed. This is advantageous in that dust or dirt, collected in the air passing holes 151b and 152b of the first and second cyclones 151 and 152 without having passed therethrough, can be easily removed.

As shown in FIGS. 7B and 8, the cyclone unit 150 may further include a first discharge opening 150c and a second discharge opening (opposite side of cyclone unit 250C) communicated with inner spaces of the first and second cyclones 151 and 152 so that dust/dirt filtered air can be discharged. As shown, the first discharge opening 150c and the second discharge opening (not shown) may be provided at two sides of the cyclone unit 150. Although the second discharge opening is not visible in the drawings, the second discharge opening may be understood as a mirror image of the first discharge opening 150c shown in FIG. 7A. The fan unit 170 may be connected to each of the first discharge opening 150c and the second discharge opening, such that filtered air is discharged to the outside. As shown in FIG. 7B, the second discharge opening (similar to the first discharge opening) has a hollow interior in communication with the hollow interior of the second cyclone 152.

Figure 9A:
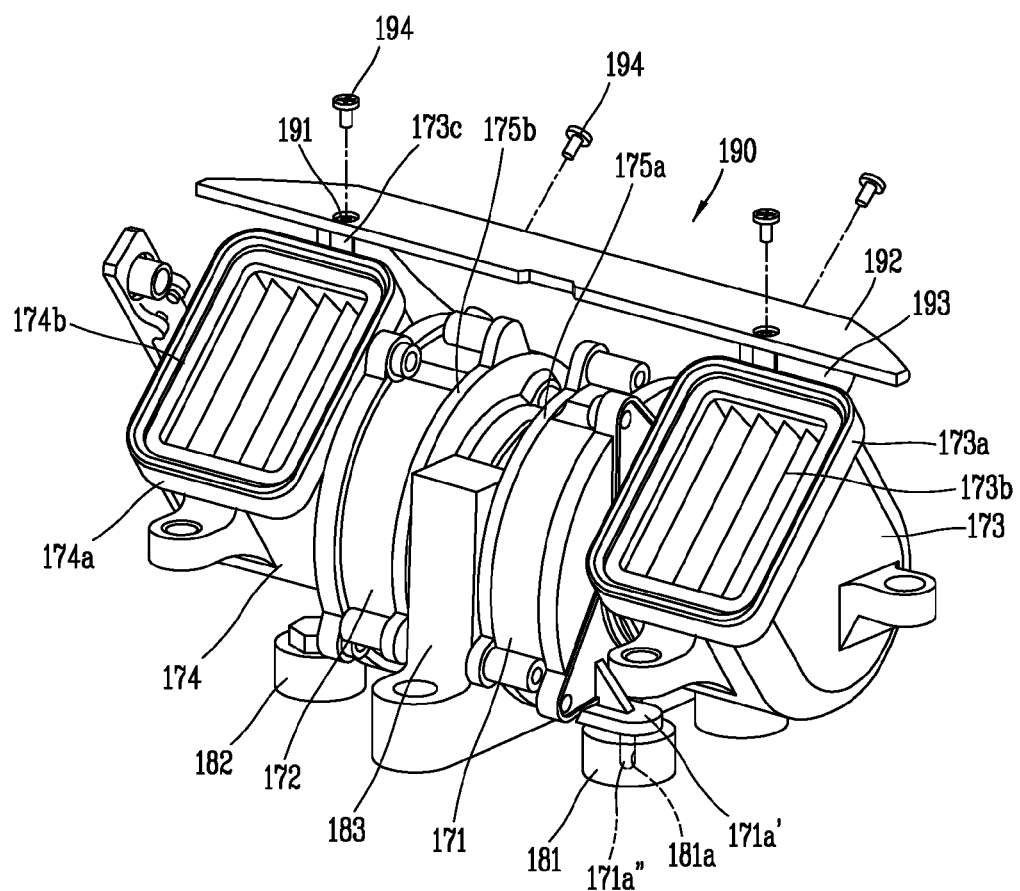
FIG. 9A is a perspective view of the fan unit shown in FIG. 6.
Figure 9B:
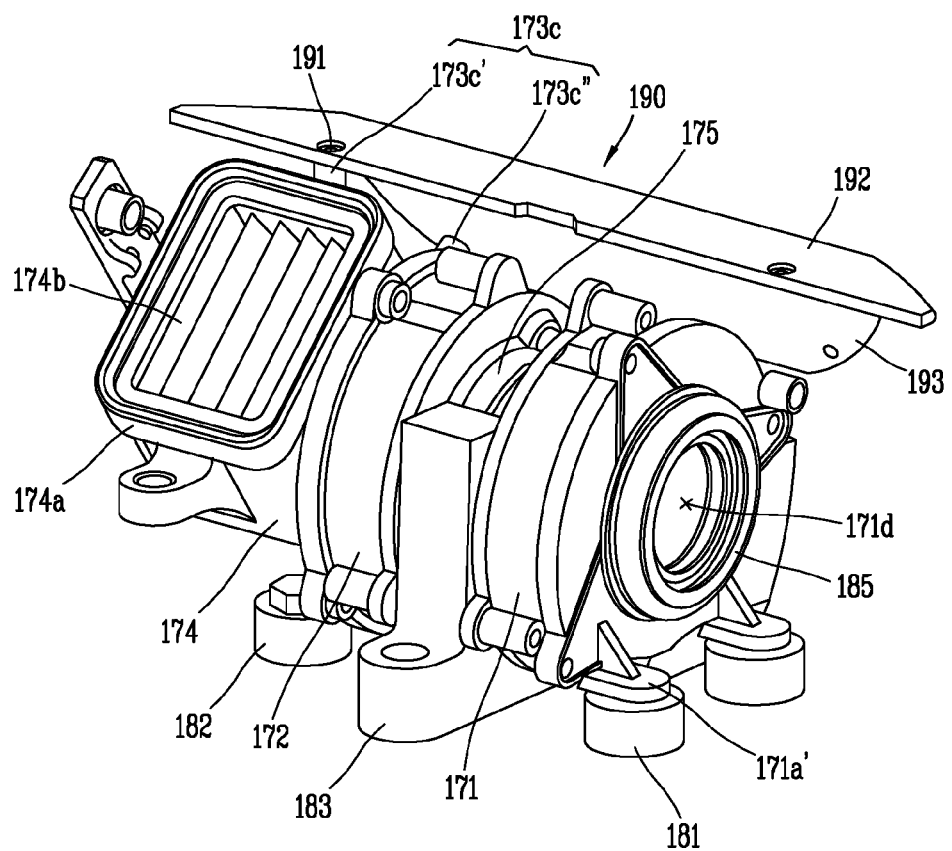
FIG. 9B illustrates a state where a first communication member has been removed from the fan unit of FIG. 9A.
Figure 9C:
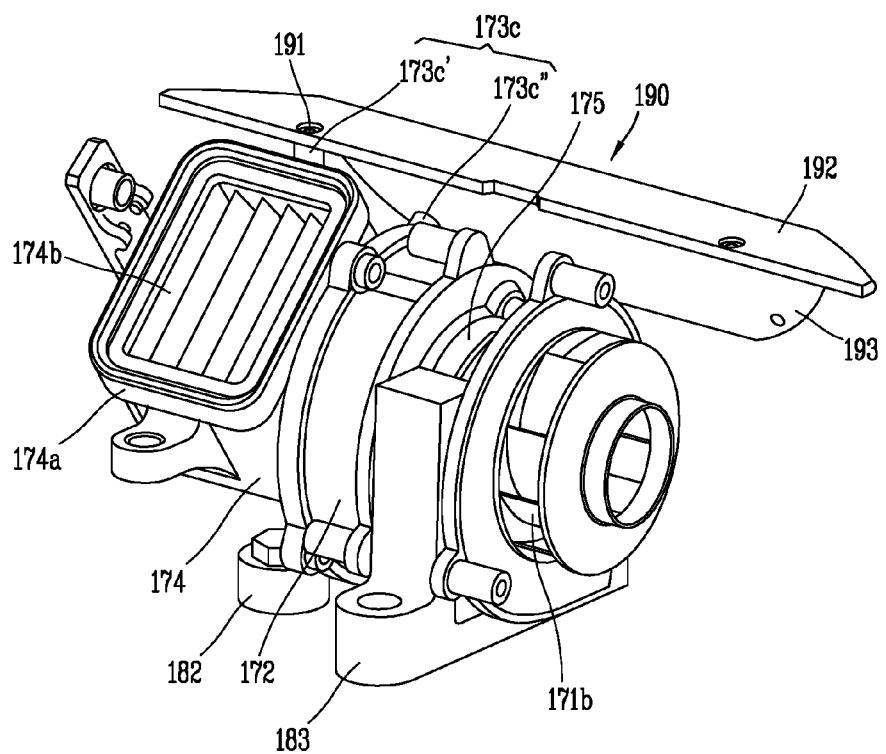
FIG. 9C illustrates a state where a first fan cover has been removed from the fan unit of FIG. 9B.
Figure 9D:
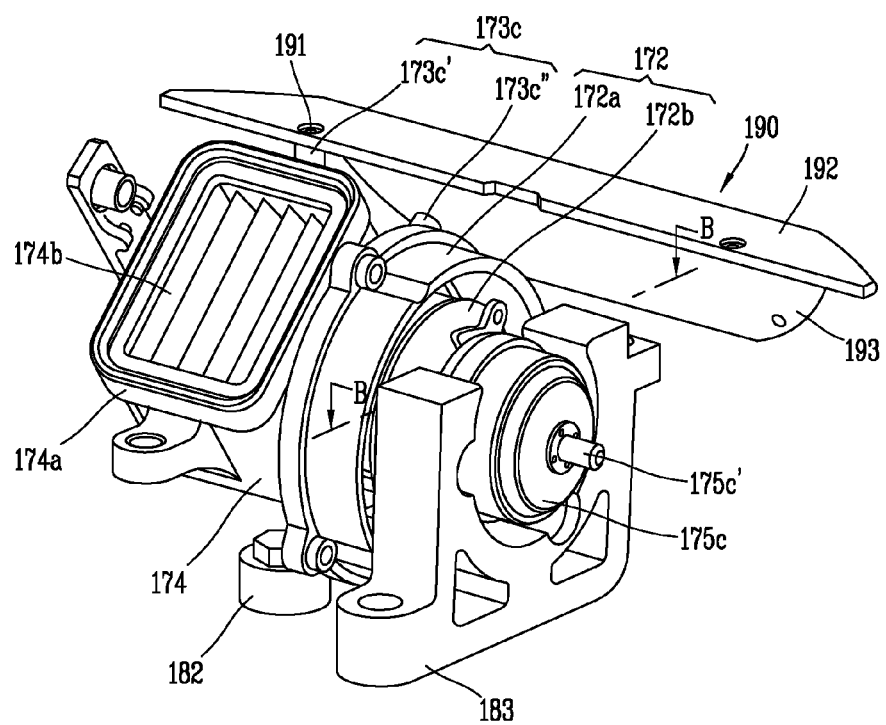
FIG. 9D illustrates a state where a first fan, a first motor housing and a second motor housing have been removed from the fan unit of FIG. 9C.
Figure 9E:
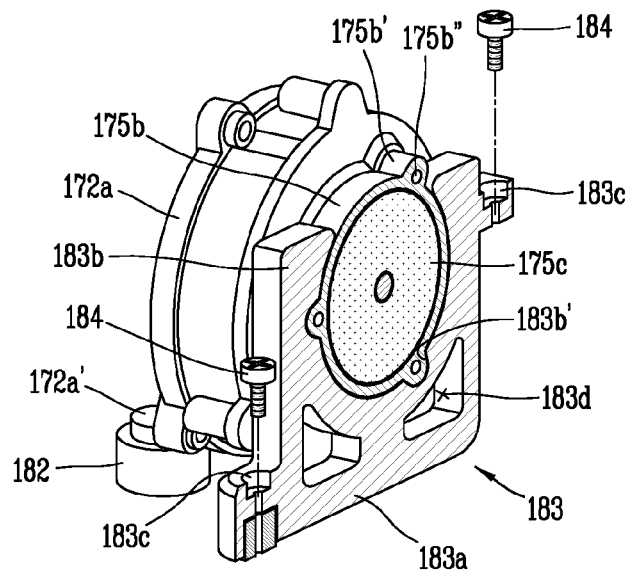
FIG. 9E is taken along line 'B-B' in the fan unit shown in FIG. 9D.

FIG. 9A is a perspective view of the fan unit 170 shown in FIG. 6, FIG. 9B illustrates a state where a first communication member 173 has been removed from the fan unit 170 of FIG. 9A, and FIG. 9C illustrates a state where a first fan cover 175 has been removed from the fan unit 170 of FIG. 9B. FIG. 9D illustrates a state where a first fan 171b, a first motor housing 175a and a second motor housing 175b have been removed from the fan unit 170 of FIG. 9C. FIG. 9E is a view taken along line 'B-B' in the fan unit 170 shown in FIG. 9D.

The fan unit 170 includes a motor part 175, a first fan part 171, a second fan part 172, a first communication member 173 and a second communication member 174. Although the second fan part 172 is not visible in the drawings, the second fan part 172 may be understood as a mirror image of the first fan part 171 shown in FIG. 9C.

The motor part or module 175 may be configured to generate a driving or a suction force, and may be provided at a central part of the fan unit 170. The motor part 175 includes a motor 175c, and a motor housing for accommodating the motor 175c therein. The motor 175c may be provided with rotation shafts at two sides thereof. The motor housing may be composed of a first motor housing 175a and a second motor housing 175b coupled to each other to accommodate the motor 175c therein.

The first fan part or module 171 and the second fan part or module 172 are connected to two sides of the motor part 175. The first fan part 171 includes a first fan 171b connected to a rotation shaft 175c' provided at one side of the motor 175c, and a first fan cover 171 a configured to accommodate the first fan 171 b therein. And the second fan part 172 includes a second fan 172b connected to a rotation shaft provided at another side of the motor 175c, and a second fan cover 172a configured to accommodate the second fan 172b therein.

The first and second fans 171b and 172b are configured to generate a suction force by being rotated when the motor 175c is driven, and to discharge filtered air to the outside. Each of the first and second fans 171 b and 172b may be a volute fan.

The first fan cover 171a is provided with a first air inlet 171d (FIG. 9B) in a direction of a rotation shaft of the first fan part 171, and is provided with a first air outlet 171e (FIG. 10) in a radius direction of the first fan part 171. Likewise, the second fan cover 172a is provided with a second air inlet in a direction of a rotation shaft of the second fan part 172, and is provided with a second air outlet in a radius direction of the second fan part 172. Although the second air inlet and the second air outlet are not visible in the drawings, the second air inlet may be understood as a mirror image of the first air inlet 171d shown in FIG. 9B, and the second air outlet may be understood as a mirror image of the first air outlet 171e shown in FIG. 10.

A mechanism to suck and discharge air according to such a structure will be explained in more detail. Dust-filtered air is introduced into the first fan cover 171a through the first air inlet 171d by a suction force due to rotation of the first fan part 171. The air is moved to a side direction by rotation of the first fan part 171 implemented as a volute fan, and is discharged out through the first air outlet 171e. Such a mechanism may be equally applied to processes to suck and discharge air by rotation of the second fan part 172.

The first communication member 173 is configured to connect the first discharge opening 150c of the cyclone unit 150 with the first fan part 171, and thus to guide air introduced into the inner space of the first cyclone 151 into the first fan part 171. Likewise, the second communication member 174 is configured to connect the second discharge opening of the cyclone unit 150 with the second fan part 172, and thus to guide air introduced into the inner space of the second cyclone 152 into the second fan part 172.

As aforementioned (refer to FIGS. 6 to 7B), in a case where the cyclone unit 150 includes the first case 153 and the second case 154, the first case 153 may be provided with the first discharge opening 150c and the second discharge opening, and may be coupled to each of the first and second communication members 173 and 174.

A first coupling member 155 for coupling with the first communication member 173, and a second coupling member 156 for coupling with the second communication member 174 may be provided at two sides of the first case 153.

For instance, each of the first and second coupling members 155 and 156 may include a hook and an elastic member. More specifically, the hooks are rotatably coupled to two sides of the first case 153, and are locked by the first and second communication members 173 and 174. The elastic members are configured to elastically press the hooks so that a locked state of the hooks to the first and second communication members 173 and 174 can be maintained. The first and second communication members 173 and 174 may be provided with locking protrusions 173a and 174a configured to lock the hooks so that the first case 153 can be prevented from being separated from the first and second communication members 173 and 174.

Coupling of the first case 153 with the first and second communication members 173 and 174 is not limited to the above coupling. That is, the first case 153 may be coupled with the first and second communication members 173 and 174 in various manners without an additional coupling member, e.g., by using a locking structure or by bonding.

Fine dust filters 173b and 174b, configured to filter fine dust from dust-filtered air, may be mounted to the first and second communication members 173 and 174. As the fine dust filters 173b and 174b, HEPA filters may be used. For replacement, the fine dust filters 173b and 174b may be configured to be exposed to the outside when the cyclone unit 150 is separated from the first and second communication members 173 and 174.

When the motor 175c of the fan unit 170 and the first and second fans 171b, 172b are driven, vibrations occur from the robot cleaner. If a suction force is increased for enhancement of a cleaning function, the motor 175c and the first and second fans 171b, 172b are rotated more rapidly. This may cause severe vibrations.

To solve such problems, a supporting unit 180 configured to support the fan unit 170 may be disposed between an inner bottom surface of the cleaner body 101 and the fan unit 170. The supporting unit 180 is formed of an elastic material (e.g., rubber, urethane, silicone, etc.) so as to absorb vibrations generated from the fan unit 170. The supporting unit 180 is configured to elastically support the motor part 175, the first fan part 171 and the second fan part 172 which are the main components where vibrations occur. The supporting unit 180 includes a motor supporting member 183 configured to elastically support the motor part 175, and first and second fan supporting members 181, 182 configured to elastically support the first and second fan parts 171, 172.

The motor supporting member 183 is installed on an inner bottom surface of the cleaner body 101, and is formed to enclose or surround at least part of the motor part 175. Referring to FIGS. 9D and 9E, the motor supporting member 183 is formed to enclose an outer circumference of the motor housings 175a, 175b.

Referring to FIG. 9E, the motor supporting member 183 may include a base part 183a installed on the inner bottom surface of the cleaner body 101, and an extending part 183b upward extending from the base part 183a so as to enclose at least part of the motor part 175. The base part 183a and the extending part 183b may be integrally formed with each other by injection molding.

Coupling holes 183c are formed at the motor supporting member 183, and coupling members 184 (e.g., fasteners) to the inner bottom surface of the cleaner body 101 through the coupling holes 183c, thereby fixing the motor supporting member 183 to the cleaner body 101. In the drawings, the coupling holes 183c are formed at two sides of the motor supporting member 183.

A plurality of ribs protrude from an outer circumference of the first motor housing 175a, and a plurality of ribs 175b' (FIG. 9E) protrude from an outer circumference of the second motor housing 175b. The ribs 175b' are provided therein a coupling structure. For instance, the ribs of the first motor housing 175a are provided with protrusions, and the ribs 175b' of the second motor housing 175b are provided with accommodation grooves 175b" for accommodating the protrusions therein. As the protrusions are fitted into the accommodation grooves 175b", the first motor housing 175a and the second motor housing 175b may be coupled to each other.

An inner side of the extending part 183b may be formed to correspond to an outer circumference of the motor part 175, so as to enclose at least part of the motor part 175. The extending part 183b may be formed to cover at least one of the aforementioned plurality of ribs 175b'. In this case, an accommodation groove 183b' is formed in the extending part 183b, in correspondence to the at least one rib. With such a configuration, as the rib 175b' is accommodated in the accommodation groove 183b', the motor part 175 may be fixed to the motor supporting member 183 more stably.

A hollow part 183d may be formed between the base part 183a and the extending part 183b, thereby reducing vibrations from being transmitted to the base part 183a from the extending part 183b. In the drawings, the hollow part 183d is formed at the motor supporting member 183 in plurality.

The first and second fan supporting members 181, 182 are configured to elastically support the first and second fan covers 171a, 172a, respectively. In the drawings, protruding parts 171a', 172a' protrude from the first and second fan covers 171a, 172a, so as to face the inner bottom surface of the cleaner body 101. The first and second fan supporting members 181, 182 are disposed between the inner bottom surface of the cleaner body 101 and the protruding parts 171a', 172a'.

The first and second fan supporting members 181, 182 may be fixed to the protruding parts 171a', 172a'. For instance, referring to FIGS. 6 and 9A, a protrusion 171a" may be formed to protrude from the protruding part 171a', toward the inner bottom surface of the cleaner body 101. An insertion groove 181a configured to insert the protrusion 171a" may be formed at the first fan supporting member 181. The first and second fan supporting members 181, 182 may be coupled to the protruding parts 171a', 172a', respectively, by another coupling structure, e.g., a coupling structure using screws, a bonding coupling structure, etc.

The first and second fan supporting members 181, 182 may be fixed to the inner bottom surface of the cleaner body 101, or may be supported on the inner bottom surface of the cleaner body 101 in a non-fixed state. In the case where the first and second fan supporting members 181, 182 are fixed to the inner bottom surface of the cleaner body 101, a coupling structure using screws may be used.

As aforementioned, the first fan part 171 is connected to the first communication member 173, and the second fan part 172 is connected to the second communication member 174. Accordingly, vibrations generated from the first and second fan parts 171, 172 may be transmitted to the first and second communication members 173, 174 and noise may occur as the components come in contact with each other.

For reduction of such noise, a first connection member 185, formed of an elastic material so as to absorb vibrations generated from the first fan part 171, may be disposed between the first fan part 171 and the first communication member 173. Likewise, a second connection member (not shown), formed of an elastic material so as to absorb vibrations generated from the second fan part 172, may be disposed between the second fan part 172 and the second communication member 174.

Referring to FIG. 9B, the first connection member 185 may be formed to have a ring shape so as to enclose the first air inlet 171d of the first fan cover 171a. The first connection member 185 is pressurized when the first fan part 171 and the first communication member 173 are coupled to each other, thereby being fitted to the first fan part 171 and the first communication member 173. The second connection member may be also formed to have a ring shape so as to enclose the second air inlet, in correspondence to the first connection member 185. The second connection member is formed to seal a gap occurring when the second communication member 174 and the second fan part 172 are coupled to each other.

The fan unit 170 may be a main component of the robot cleaner 100 where noise occurs. Moreover, since the robot cleaner 100 of the present disclosure is provided with the plurality of fan parts 171, 172 corresponding to the plurality of cyclones 151, 152, noise occurs. Hereinafter, a structure for reducing noise generated from the fan unit 170 will be explained.

Referring to FIGS. 9A to 9E with FIG. 6, a noise reducing member 190 is disposed above the fan unit 170 so as to reduce noise. As shown, the noise reducing member 190 extends toward two sides of the motor part 175, thereby covering the first and second fan parts 171, 172. If necessary, the noise reducing member 190 may more extend to cover the first and second communication members 173, 174.

For smooth exhaustion, the noise reducing member 190 is formed not to cover the first air outlet 171e of the first fan cover 171a and the second air outlet of the second fan cover 172a. The noise reducing member 190 extends to a lower side of the fan unit 170 from an upper side of the fan unit 170. In this case, the noise reducing member 190 may extend up to an upper side of the first and second air outlets, or may be provided with exhaustion holes at parts corresponding to the first and second air outlets.

As the noise reducing member 190 is disposed to cover an upper side of the fan unit 170, noise generated from the motor 175c and the first and second fans 171b, 172b may be prevented from being transmitted to the upper side of the fan unit 170. As noise is concentrated or directed into the inner bottom surface by the noise reducing member 190, a user may receive noise of a low level.

The noise reducing member 190 may reduce noise by irregularly reflecting or absorbing noise generated from the fan unit 170. For diffused reflection of noise, an inner side surface of the noise reducing member 190, which faces the fan unit 170, may have a concavo-convex structure. For absorption of noise, a noise absorbent configured to absorb at least part of noise may be attached to the inner side surface of the noise reducing member 190, which faces the fan unit 170. The noise absorbent may be formed of a porous material such as a sponge.

The noise reducing member 190 is disposed to cover most regions of the upper side of the fan unit 170. However, in some cases, the noise reducing member 190 may be disposed to cover a partial region of the upper side of the fan unit 170. Referring to FIG. 5, the cyclone unit 150 is connected to a front upper side of the fan unit 170. In this case, the noise reducing member 190 may be installed at the fan unit 170 so as to cover a rear upper side of the fan unit 170.

Since the noise reducing member 190 is configured to reduce noise generated from the motor 175*c* and the first and second fans 171*b*, 172*b*, the noise reducing member 190 may be installed at the fan unit 170. In the drawings, the noise reducing member 190 is mounted to the first and second communication members 173, 174. However, the installation position of the noise reducing member 190 is not limited to the fan unit 170. That is, the noise reducing member 190 may be mounted to any region adjacent to the fan unit 170, e.g., the cyclone unit 150, the inside of the cleaner body 101, etc. For instance, the noise reducing member 190 may be installed at the first case 153 of the cyclone unit 150, and may extend from the first case 153 toward the fan unit 170 so as to cover an upper side of the fan unit 170.

An installation structure of the noise reducing member 190 will be explained in more detail. A coupling boss 173*c* for coupling with the noise reducing member 190 protrudes from each of the first and second communication members 173, 174. Referring to FIGS. 5 and 9A, a first coupling boss 173*c*' and a second coupling boss 173*c*", which protrude toward the noise reducing member 190, are provided at the first communication member 173. The noise reducing member 190 is spaced apart from the fan unit 170, in a supported state by the first and second coupling bosses 173*c*', 173*c*". Coupling members 194 are coupled to the first and second coupling bosses 173*c*', 173*c*" via coupling holes of the noise reducing member 190, thereby fixing the noise reducing member 190 to the first communication member 173.

The noise reducing member 190 extends along a direction, so as to cover the motor part 175 and the first and second fan parts 171, 172 disposed at two sides of the motor part 175. The noise reducing member 190 may extend toward a lower side of the fan unit 170, from an upper side of the fan unit 170.

For instance, as shown, the noise reducing member 190 includes a base part or plate 192 and an extending or plate part 193. The base part 192 and the extending part 193 may have a flat shape, and may be connected to each other in a bent manner. The base part 192 is disposed to cover an upper side of the fan unit 170, and is mounted to the first coupling bosses 173*c*' of the first and second communication members 173, 174 by the coupling members 194. The extending part 193 downward extends from the base part 192 in a bent manner, thereby covering a rear upper side of the fan unit 170. The extending part 193 is mounted to the second coupling bosses 173*c*" of the first and second communication members 173, 174 by the coupling members 194. For smooth exhaustion, the extending part 193 is disposed not to cover the first air outlet 171*e* of the first fan cover 171*a*, and the second air outlet of the second fan cover 172*a*.

A noise absorbent, configured to absorb at least part of noise generated from the fan unit 170, may be attached to the inside of at least one of the base part 192 and the extending part 193. The noise reducing member 190 may be formed to have a rounded shape corresponding to the appearance of the fan unit 170, so as to enclose at least part of the fan unit 170. For instance, the noise reducing member 190 may be formed in a semi-circular shape, and may be disposed to cover a rear upper side of the fan unit 170.

Figure 10:
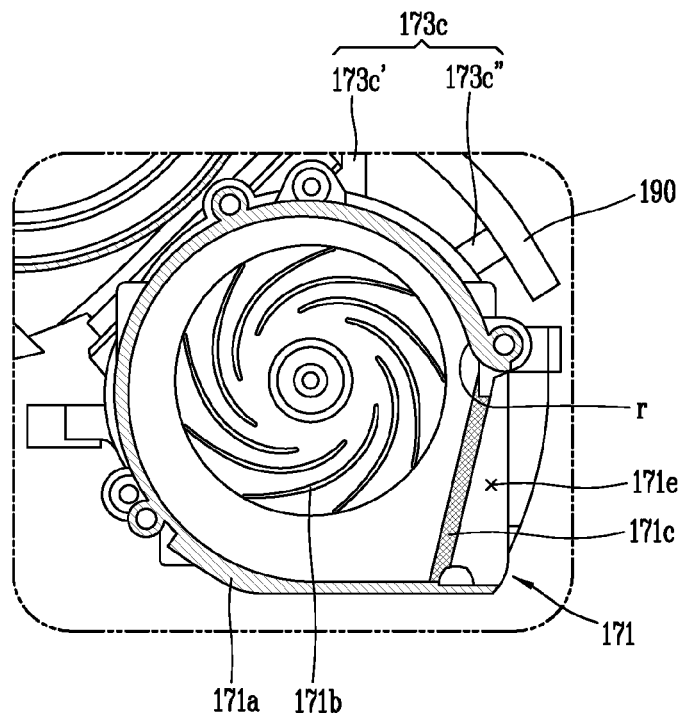
FIG. 10 is an enlarged view of part 'C' shown in FIG. 5.

For noise reduction and air volume increase when the first and second fan parts 171, 172 are driven, the following structure may be applied. This will be explained in more detail with reference to FIG. 10. FIG. 10 is an enlarged view of part 'C' shown in FIG. 5.

Referring to FIG. 10, a gap may be maintained between an inner circumferential surface of the first fan cover 171*a*, and an inner portion of the first fan 171*b* disposed close to the inner circumferential surface of the first fan cover 171*a*. Likewise, a gap may be maintained between an inner circumferential surface of the second fan cover 172*a*, and an inner portion of the second fan 172*b* disposed close to the inner circumferential surface of the second fan cover 172*a*.

The first fan cover 171*a* may be provided with a first exhaustion guide (r) and the second fan cover 172*a* may be provided with a second exhaustion guide, each exhaustion guide for guiding smooth exhaustion of dust-separated air. This will be explained in more detail with reference to the first exhaustion guide (r). The first exhaustion guide (r) may extend from an inner circumferential surface of the first fan cover 171*a* toward the first air outlet 171*e*, in a rounded manner. Although the second exhaustion guide is not visible, the second exhaustion guide may be understood as a mirror image of the first exhaustion guide (r) shown in FIG. 10.

A first exhaustion hole (not shown) corresponding to the first air outlet 171*e*, and a second exhaustion hole (not shown) corresponding to the second air outlet may be formed at the cleaner body 101.

For exhaustion of cleaner air, a fine dust filter 171*c* may be mounted to at least one of the first fan cover 171 a and the cleaner body 101. As the fine dust filter 171*c*, a HEPA filter may be used to filter fine dust smaller than the prescribed size. The fine dust filter 171*c* is mounted to cover at least one of the first air outlet 171*e* and the first exhaustion hole, and is configured to filter fine dust from dust-separated air. Likewise, the fine dust filter 171*c* may be mounted to at least one of the second fan cover 172*a* and the cleaner body 101.

As aforementioned, in the robot cleaner 100, dirty air is sucked through the suction unit 130, and dust is separated from the dirty air through the cyclone unit 150. The dust-separated air is discharged to the outside through the fan unit 170. The filtered dust is accumulated in the dust box 160. The dust may be blown by flow of air generated when the robot cleaner 100 is driven, thereby lowering cleaning performance. The dust may be also blown when discharged from the dust box 160, thereby causing discomfort to a user.

Figure 11:
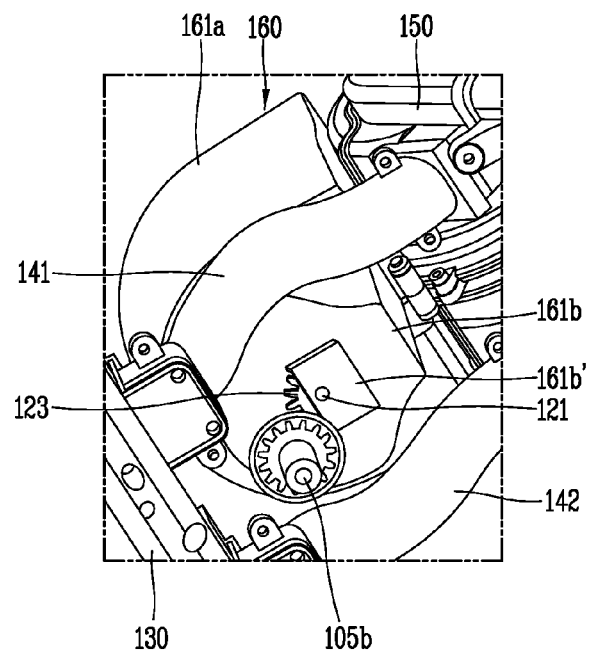
FIG. 11 illustrates a view of part 'D' in FIG. 5, which is viewed from a bottom surface.
Figure 12:
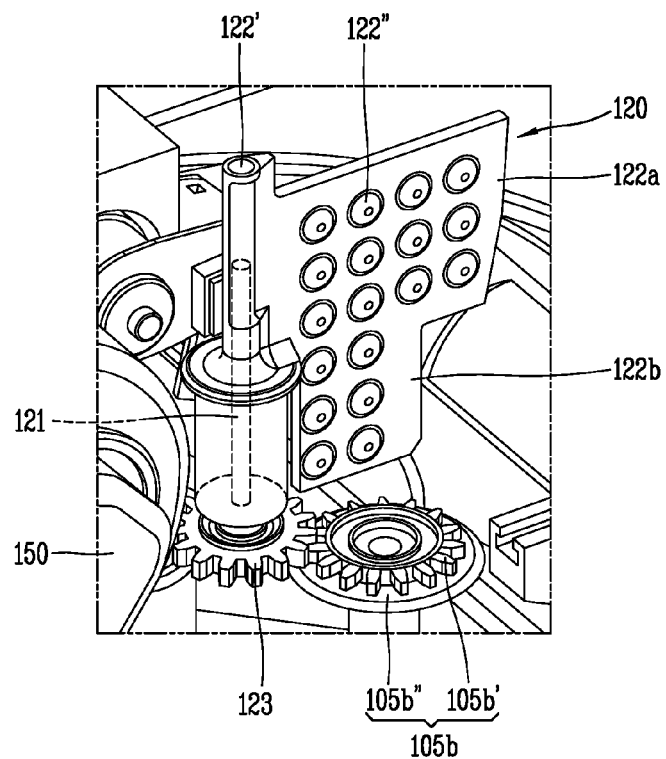
FIG. 12 is an illustration when a dust box is removed in order to explain a driving mechanism of a driving unit and a pressing unit shown in FIG. 5.

The present disclosure provides the following structure, in order to prevent scattering of dust accumulated in the dust box 160, and in order to provide a user's convenience during a dust discharge process. FIG. 11 illustrates a view of part 'D' in FIG. 5, which is viewed from a bottom surface. FIG. 12 illustrates a view when the dust box 160 has been removed in order to explain a driving mechanism of a driving unit 105 and a pressing unit 120 shown in FIG. 5.

Referring to FIGS. 11 and 12 with FIGS. 3 and 5, the dust box 160 is detachably mounted to the cyclone unit 150 so as to be communicated with the dust discharge opening 150*e*. The dust box 160 may be coupled to the cyclone unit 150 so as to be communicated with the dust discharge opening 150*e* formed at a front side of the cyclone unit 150, thereby being disposed between the suction unit 130 and the cyclone unit 150. The dust discharge opening 150*e* may be communicated with a central part of the dust box 160 such that dust is uniformly discharged to the inside of the dust box 160.

Based on such a structure, one region of the dust box 160 may be provided on the first and second guiding members 141, 142. Two sides of the first portion 161*a* may be provided on the first and second guiding members 141, 142. Another region of the dust box 160 may be provided between the first and second guiding members 141, 142. At least part of the second portion 161*b* downward-extending from the first portion 161*a* is accommodated between the first and second guiding members 141, 142.

The driving unit or module 105 may be provided between the first and second guiding members 141, 142. Referring to FIG. 5, the driving unit 105 includes a motor 105*a* and a driving gear 105*b*. FIG. 11 illustrates only the driving gear 105*b*, excluding the motor 105*a*, for convenience. The motor 105*a* is electrically connected to the controller, and is rotatable according to a control signal applied thereto in two directions (i.e., clockwise or counterclockwise). The motor 105*a* may be mounted to an inner bottom surface of the cleaner body. The driving gear 105*b* is connected to a rotation shaft of the motor 105*a*, and is configured to transmit a driving force of the motor 105*a* by being engaged with a driven gear 123 of the pressing unit 120 to be explained later.

The pressing unit or dust compressor 120 may be installed at the dust box 160, and the pressing unit 120 is rotatable in two directions by receiving a driving force from the driving unit 105. Rotation of the motor 105*a* may be controlled such that such a bidirectional rotation of the pressing unit 120 is repeatedly performed. Dust collected in the dust box 160 is pressed by the bidirectional rotation of the pressing unit 120, thereby having a decreasing volume of the collected dirt.

The pressing unit 120 may include a rotation shaft 121, a pressing member or plate 122 and a driven gear 123. The rotation shaft 121 is installed to pass through a bottom surface of the dust box 160. One part of the rotation shaft 121 is inserted into the dust box 160, and another part of the rotation shaft 121 protrudes from the bottom surface of the dust box 160. A sealing structure for sealing a gap between the rotation shaft 121 and the dust box 160 may be provided between the rotation shaft 121 and the dust box 160.

The pressing member 122 is installed at the rotation shaft 121 inserted into the dust box 160, and is rotatable in the dust box 160 based on the rotation of the rotation shaft 121 rotates. Dust collected in the dust box 160 is moved to one side of the dust box 160 by the rotation of the pressing member 122.

To prevent idling of the pressing member 122 when the rotation shaft 121 rotates, a fixing structure may be provided at the rotation shaft 121 and the pressing member 122. For instance, a groove 122' may be formed at the pressing member 122, and a protrusion 162*a* (see FIG. 13A) corresponding to the groove may be formed on the cover 162. The rotation shaft 121 may be formed in a shape other than a circular shape, e.g., a "D"-shape, to correctly orient the pressing member 122. The inside of the pressing member 122, where the rotation shaft 121 is inserted, may have a shape corresponding to the shape of the rotation shaft 121.

The pressing member 122 may be formed to have a flat shape, and a plurality of protruding parts or protrusions 122" may be provided from at least one surface of the pressing member 122. The plurality of protruding parts 122" are configured to restrict dust from being adhered to the pressing member 122, or to press dust collected at one side of the dust box 160 in a non-uniform manner. The plurality of protruding parts 122" may have a dome shape.

As aforementioned, the dust box body 161 may include the first portion 161*a* and the second portion 161*b* having different sectional areas. Similarly, the pressing member 122 may include a first pressing portion plate 122*a* and a second pressing portion or plate 122*b* having different sectional areas.

The first pressing portion 122*a* may be provided in the first portion 161*a* so as to compress dust inside the first portion 161*a*. The second pressing portion 122*b* downward-extends from the first pressing portion 122*a*, and may be provided in the second portion 161*b* so as to compress dust inside the second portion 161*b*. As shown, the second pressing portion 122*b* may be formed to have a smaller area than the first pressing portion 122*a* in correspondence to an area of the second portion 161*b*.

The driven gear 123 may be provided at the rotation shaft 121 which protrudes from the dust box 160, thereby rotating the rotation shaft 121. Since the pressing member 122 is connected to the rotation shaft 121, the pressing member 122 is rotated, when the driven gear 123 is rotated. To prevent idling of the rotation shaft 121 when the driven gear 123 is rotated, a fixing structure may be provided at the driven gear 123 and the rotation shaft 121. Detailed explanations of the fixing structure will be replaced by the fixing structure between the rotation shaft 121 and the pressing member 122.

The driven gear 123 is configured to transmit a driving force received from the motor 105*a* to the pressing member 122, by being engaged with the driving gear 105*b* of the driving unit 105. Since the driven gear 123 is provided at the dust box 160, the engaged state between the driving gear 105*b* and the driven gear 123 is released, if the dust box 160 is separated from the cyclone unit 150 for removal of dust. When the dust box 160 is re-coupled to the cyclone unit 150, the driving unit 105 is connected to the pressing unit 120. In order to facilitate accommodation of a tooth of one gear into two teeth of another gear, an upper end of teeth 105*b*' of the driving gear 105*b* may be inclined from a lower end of teeth of the driven gear 123.

As shown in FIG. 12, the driving gear 105*b* may be provided with a supporting portion or plate 105*b*" configured to support the driven gear 123 when the teeth of the driven gear 123 are engaged with the teeth 105*b*' of the driving gear 105*b*. The supporting portion 105*b*" protrudes more than the teeth 105*b*' of the driving gear 105*b* in a side direction, so as to support the teeth of the driven gear 123 engaged with the teeth 105*b*' of the driving gear 105*b*. The supporting portion 105*b*" may have a disc shape having the rotation shaft of the motor 105*a* as a center.

Figure 13A:
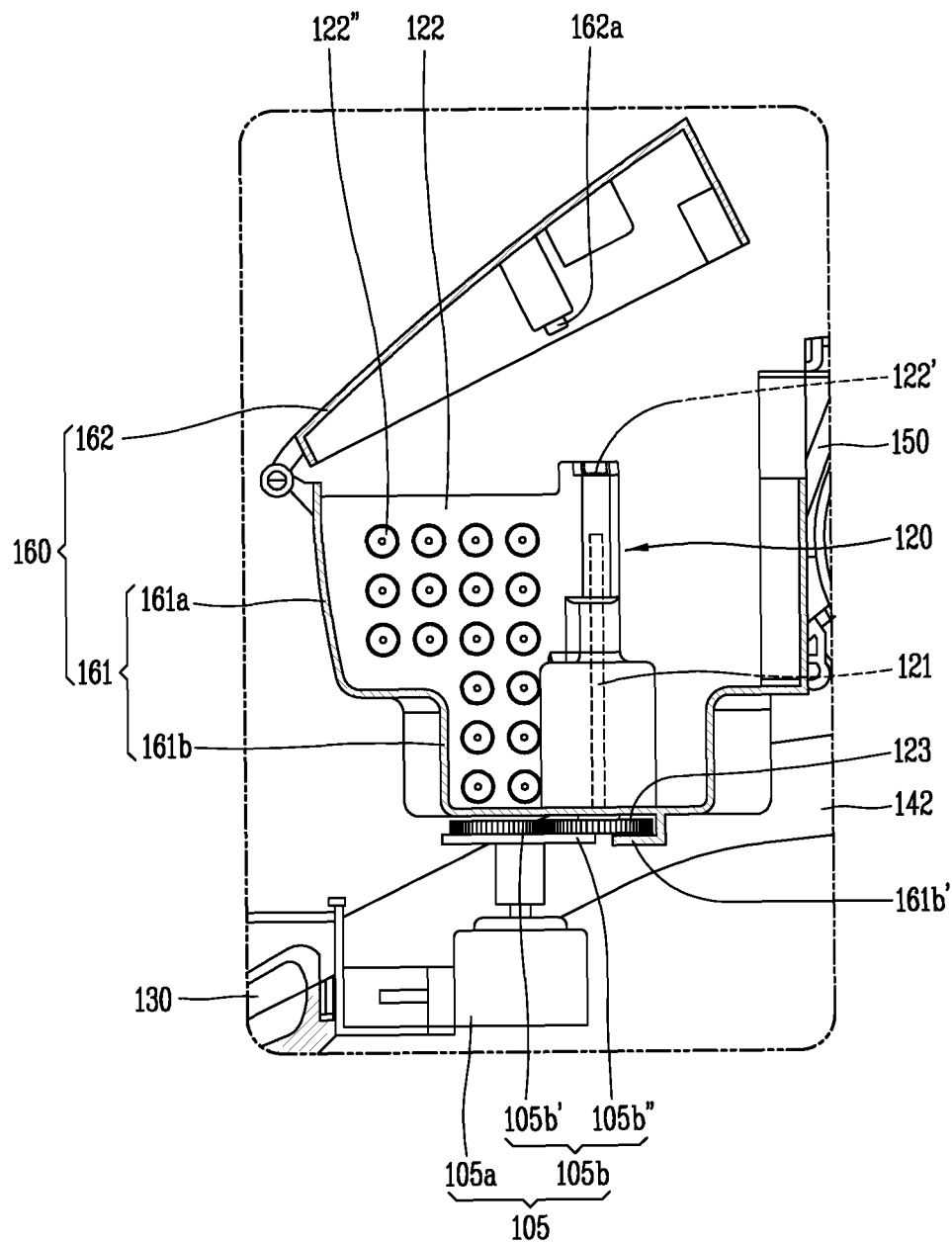
FIGS. 13A and 13B illustrate a dust box cover configured to open and close an opening of a dust box body.

Referring to FIGS. 11 and 13A, an accommodation portion or housing 161*b*' is configured to accommodate therein another part of the driven gear 123 such that only part of the driven gear 123 engaged with the driving gear 105*b* is exposed to the outside, and may be formed at a lower side of the dust box 160. In the drawings, the accommodation portion 161*b*' protrudes from a bottom surface of the dust box 160, more specifically, a bottom surface of the second portion 161*b*.

Based on such a structure, a part of the driven gear 123 is accommodated in the accommodation portion 161*b*', and introduction of foreign materials into the driven gear 123 and damage of the driven gear 123 may be prevented. Considering that the other part of the driven gear 123 is exposed to the outside when the dust box 160 is detached from the cleaner body 101, such structure is more effective because the part of the driven gear 123 is accommodated in the accommodation portion 161*b*'.

Figure 13B:
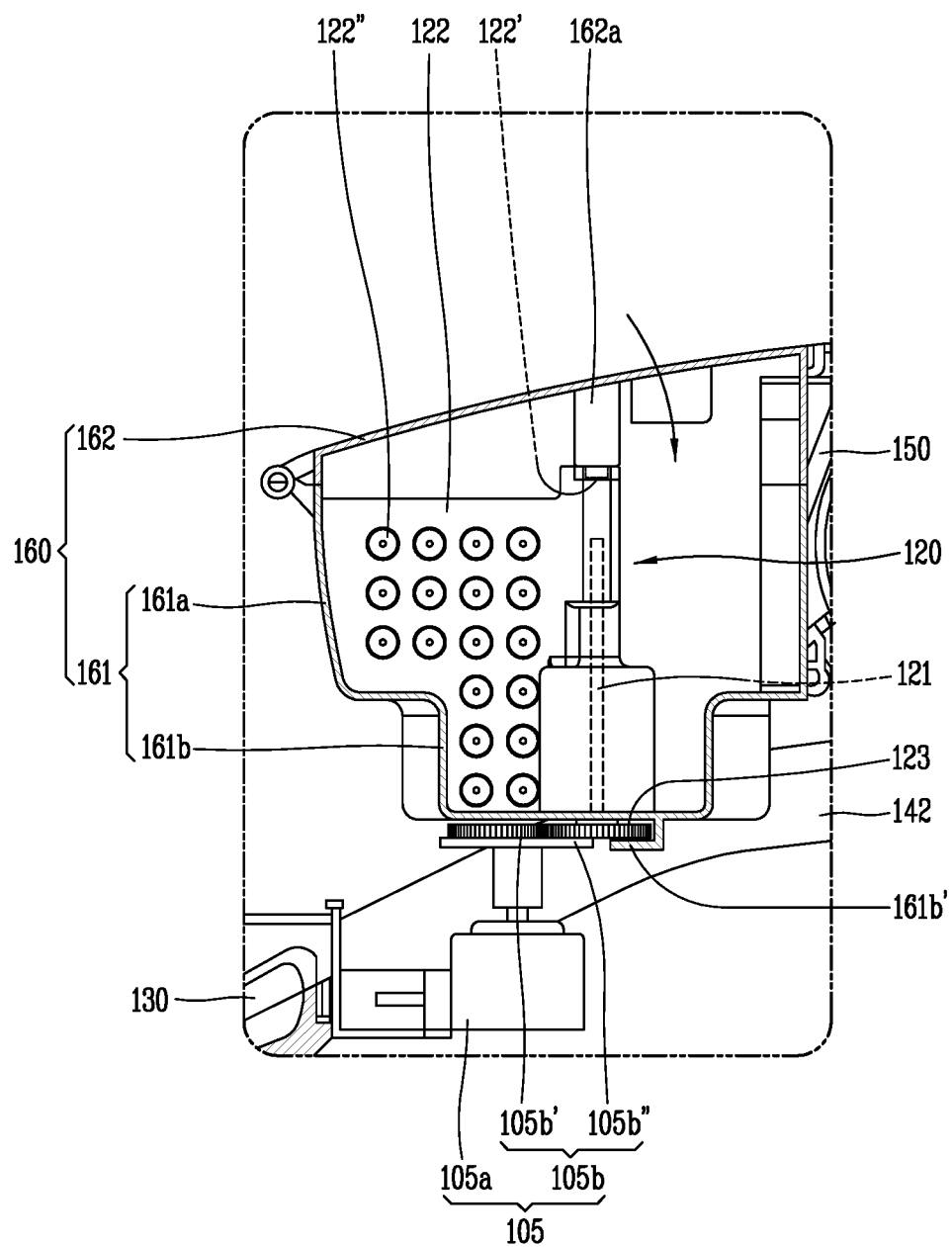

As illustrated in FIGS. 13A and 13B, the dust box 160 includes the dust box body 161 and the dust box cover 162. The pressing member 122 is accommodated in the dust box body 161, and is configured to move dust collected in the dust box 160 to one side of the dust box 160 by being rotated. The dust box cover 162 is coupled to the dust box body 161, and is configured to open and close an opening of the dust box body 161. The dust box cover 162 may be hinge-coupled to the dust box body 161, and is configured to open and close the opening of the dust box body 161 by being rotated.

As shown in FIGS. 12 and 13, a groove 122' and a protrusion 162a allow for more stable rotation of the pressing member 122. The groove 122' recessed toward the rotation shaft 121 is formed at an upper end of the pressing member 122. The groove 122' may be formed on the rotation shaft 121 if the rotation shaft extends to the top of the pressing member 122. A protrusion 162a, formed to be insertable into the groove 122' of the pressing member 122, protrudes from an inner side of the dust box cover 162. As shown in FIG. 13A, the opening of the dust box body 161 is exposed, the protrusion 162a is separated from the groove 122' of the pressing member 122.

On the other hand, as shown in FIG. 13B, if the dust box cover 162 is the opening of the dust box body 161, the protrusion 162a is inserted into the groove 122' of the pressing member 122. The pressing member 122 is connected to each of the rotation shaft 121 and the protrusion 162a, and rotates centering around the rotation shaft 121 and the protrusion 162a. Based on such a structure, if the pressing member 122 is rotated as the rotation shaft 121 rotates, the protrusion 162a inserted into the groove 122' serves to fix a rotation center of the pressing member 122 for more stable rotation.

Figure 14:
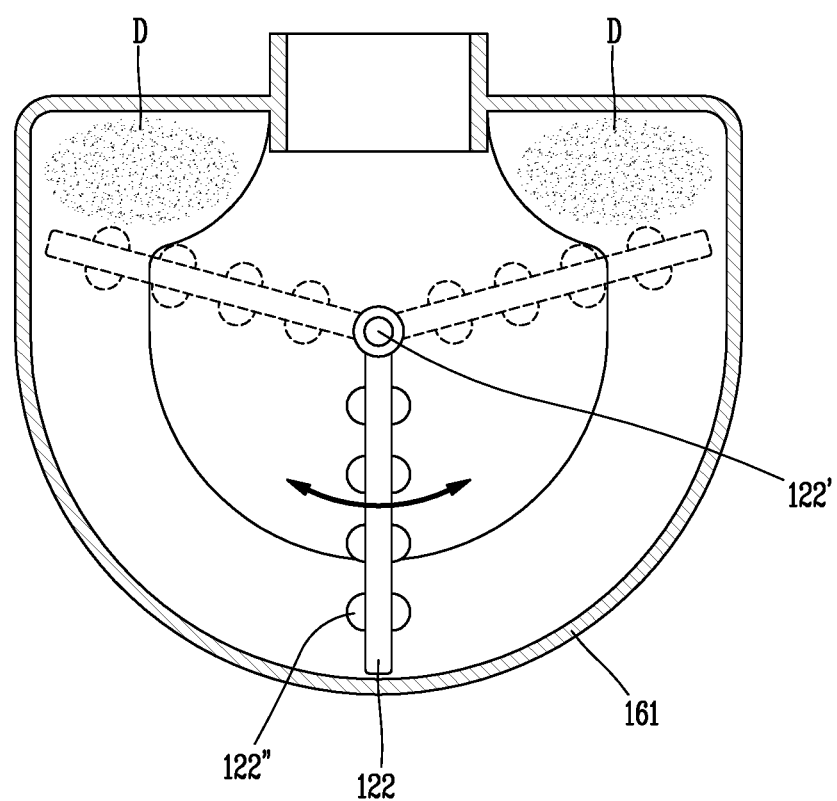
FIG. 14 illustrates dust collected by a pressing unit.

Referring to FIG. 14, the pressing unit 120 is configured to be rotatable in two directions by receiving a driving force from the driving unit 105. The pressing member 122 is rotated in the dust box 160 in two directions, thereby moving dust (D) introduced through the dust discharge opening 150e to two sides. In the drawings, the dust (D) is collected at two sides of the dust box 160 as the pressing member 122 is rotated in two directions.

The rotation of the motor 105a may be controlled such that bidirectional rotation of the pressing member 122 is repeatedly performed. For instance, if a repulsive force is applied to the motor 105a which is being rotated in an opposite direction to the rotation direction, the motor 105a may be rotated in the opposite direction. If the pressing member 122 is rotated in one direction to press dust (D) collected at one side of the dust box 160 to some degree, the motor 105a is rotated to another direction to compress dust (D) collected at another side of the dust box 160.

If the amount of the dust (D) is very small, the motor 105a may be rotated in an opposite direction, by receiving a repulsive force occurring when the pressing member 122 collides with one side wall of the dust box 160, or a repulsive force occurring due to a stopper structure provided inside or outside the pressing member 122. Alternatively, the controller may control bidirectional rotation of the pressing member 122 to be repeatedly performed, by applying a control signal to the motor 105a such that a rotation direction of the pressing member 122 is changed at predetermined time periods.

In the present disclosure, since the dust box is disposed between the suction unit and the cyclone unit, a compact design may be implemented. Further, effective air flow (having a flow change more than 90°) can be generated for separation of dust.

In the robot cleaner of the present disclosure, since a plurality of cyclones are provided in a single cyclone unit, dust can be efficiently separated from sucked air. For enhanced separation of dust, a plurality of guiding members are provided in correspondence to the plurality of cyclones. Air sucked through the suction unit is introduced into the cyclone unit in a divided manner, and the fan unit discharges air having passed through the plurality of cyclones to the outside. With such a structure, dust is separated from sucked air in a more efficient manner, and the dust-separated air is discharged to the outside. This can enhance cleaning performance of the robot cleaner.

Further, in the present disclosure, there are provided the suction guide for guiding sucked air to an inner circumferential surface of the cyclone unit, and the exhaustion guide extending from an inner circumferential surface of the fan cover toward the air outlet in a rounded manner. With such a structure, the robot cleaner can reduce noise occurring when air is sucked and discharged to the outside.

Further, since dust having a large particle size is firstly filtered by the cyclone unit, and then fine dust is filtered by the fine dust filter provided on at least one of the suction side and the exhaustion side of the fan unit. This can allow cleaner air to be discharged to the outside of the robot cleaner.

In the present disclosure, the cyclone unit having the plurality of cyclones is disposed on the rear upper side of the suction unit, and the plurality of connection members are formed with an inclination angle so as to connect the suction unit and the cyclone unit to each other. The fan unit is disposed on the rear lower side of the cyclone unit. With such a new structure and arrangement, the robot cleaner can have efficient spatial arrangement and enhanced cleaning performance.

Further, when at least part of the dust box is accommodated in a space between the plurality of connection members, the dust box may have a larger capacity within the restricted space.

Noise of the robot cleaner is mainly generated from driving of the motor and the fan. Considering this, the noise reducing member is disposed above the fan unit to prevent noise generated from the fan unit from being transmitted to the upper side. This can allow the robot cleaner to have low noise.

Further, in the present disclosure, the motor supporting member configured to elastically support the motor part, and the first and second fan supporting members configured to elastically support the first and second fan parts are provided. This can reduce vibrations and noise generated from the fan unit.

In the present disclosure, the pressing unit is configured to press dust separated through the cyclone unit and to reduce a volume of the dust, by being rotated in two directions. Thus, dust collected in the dust box can be prevented from scattering, and scattering of the dust can be reduced when the dust is discharged to the outside. This can provide a user's convenience.

Further, if the dust box cover is disposed to cover the opening of the dust box body, the protrusion inside the dust box cover is inserted into the groove of the pressing member. This can allow the pressing member to be rotated in a more stable manner.

Further, the dust box is disposed between the suction unit and the cyclone unit, and the driving unit is disposed between the first guiding member and the second guiding member. With such a new structure and arrangement, the robot cleaner can implement a more efficient spatial arrangement.

The disclosed robot cleaner may be capable of preventing scattering of dust accumulated in a dust box, and providing a user's convenience during a dust discharge process.

A robot cleaner may have a structure to enhance a dust collection function of a dust box, and an efficient spatial arrangement with other components.

A robot cleaner may include a suction unit configured to suck dust-included air; a cyclone unit configured to separate dust from the dust-included air sucked through the suction unit by using a centrifugal force, and having a dust discharge opening; a first guiding member and a second guiding member spaced apart from each other, and configured to connect the suction unit and the cyclone unit with each other; a dust box detachably mounted to the cyclone unit so as to be communicated with the dust discharge opening, and disposed on the first and second guiding members at least partially; a driving unit disposed between the first and second guiding members; and a pressing unit provided at the dust box, and mechanically connected to the driving unit when the dust box is mounted to the cyclone unit, and formed to be rotatable in two directions by receiving a driving force from the driving unit such that dust collected in the dust box is pressed to have a deceased volume.

In an embodiment of the present disclosure, the pressing unit may include a rotation shaft disposed to pass through a bottom surface of the dust box; a pressing member installed at the rotation shaft inserted into the dust box, and rotatable in the dust box; and a driven gear installed at the rotation shaft protruding from the dust box, and connected to the driving unit.

The driving unit may include a motor provided at a cleaner body; and a driving gear connected to a rotation shaft of the motor, and configured to transmit a driving force to the pressing unit by being engaged with the driven gear.

The driving gear and the driven gear may be engaged with each other when the dust box is mounted to the cyclone unit.

The driving gear may include a supporting portion configured to support the driven gear when teeth of the driven gear are engaged with teeth of the driving gear.

An accommodation portion, configured to accommodate therein another part of the driven gear such that only part of the driven gear engaged with the driving gear is exposed to the outside, may be formed at a lower side of the dust box.

The motor may be configured to be rotated in an opposite direction, if a repulsive force is applied to the motor being rotated, in the opposite direction to a rotation direction.

The dust box may include a dust box body which forms a space for collecting dust filtered by the cyclone unit, and configured to accommodate therein the pressing member; and a dust box cover coupled to the dust box body and configured to open and close an opening of the dust box body.

A groove recessed toward the rotation shaft may be formed at an upper end of the pressing member. A protrusion, configured to support rotation of the pressing member by being inserted into the groove, may protrude from an inner side of the dust box cover.

The dust box cover may be rotatably coupled to the dust box body, and the protrusion may be inserted into the groove when the dust box cover is disposed to cover the opening of the dust box body.

The dust box body may include a first portion communicated with the dust discharge opening; and a second portion formed to extend to a lower side of the first portion, having a smaller sectional area than the first portion, and accommodated between the first and second guiding members at least partially.

Two sides of the first portion may be disposed on the first and second guiding members.

The pressing member may include a first pressing portion disposed in the first portion so as to compress dust inside the first portion; and a second pressing portion downward-extending from the first pressing portion, and disposed in the second portion so as to compress dust inside the second portion. The second pressing portion may be formed to have a smaller area than the first pressing portion.

An upper side of the dust box may form upper appearance of the cleaner body.

The dust box may be formed of a transmissive material such that a user views an inner side of the dust box.

This application relates to U.S. application Ser. Nos. 14/952,760 filed on Nov. 25, 2015, and 14/956,205 filed on Dec. 1, 2015, which are hereby incorporated by reference in their entirety. Further, one of ordinary skill in the art will recognize that features disclosed in these above-noted applications may be combined in any combination with features disclosed herein.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A robot cleaner, comprising:
   a suction module configured to suck dust-included air;
   a cyclone module configured to separate dust from the dust-included air sucked through the suction module, and having a dust discharge opening;
   a first air flow guide and a second air flow guide spaced apart from each other, and connecting the suction unit to the cyclone unit;
   a dust box detachably coupled to the dust discharge opening of the cyclone module, and provided between the first and second air flow guides;
   a drive module provided between the first and second air flow guides; and
   a dust compressor provided in the dust box, and mechanically coupled to the drive module when the dust box is mounted to the cyclone module, and formed to be rotatable bi-directionally based on a driving force from the drive module such that dust collected in the dust box is pressed to have a deceased volume.

2. The robot cleaner of claim 1, wherein the dust compressor includes:

a rotational shaft disposed to pass through a bottom surface of the dust box;

a pressing plate coupled to the rotation shaft; and a first gear installed at the rotation shaft protruding from the dust box, and configured to be driven by the drive module.

3. The robot cleaner of claim 2, wherein the drive module includes:

a motor provided at a cleaner body; and a second gear connected to a rotation shaft of the motor, and configured to transmit a driving force to the dust compressor when engaged with the first gear.

4. The robot cleaner of claim 3, wherein the second gear and the first gear are engaged with each other when the dust box is mounted to the cyclone module.

5. The robot cleaner of claim 3, wherein the second gear includes a supporting plate configured to support the first gear when teeth of the first gear are engaged with teeth of the second gear.

6. The robot cleaner of claim 3, wherein a housing is configured to accommodate part of the first gear such that only part of the first gear engaged with the first gear is exposed to the outside, and is formed at a lower side of the dust box.

7. The robot cleaner of claim 3, wherein the motor is rotated in an opposite direction, when a repulsive force is applied to the motor in a direction opposite to a rotation direction of the motor.

8. The robot cleaner of claim 2, wherein the dust box includes:

a dust box body which forms a space for collecting dust filtered by the cyclone module, and configured to accommodate therein the pressing plate; and a dust box cover coupled to the dust box body and configured to open and close an opening of the dust box body.

9. The robot cleaner of claim 8, wherein a groove recessed toward the rotation shaft is formed at an upper end of the pressing plate, and wherein a protrusion, configured to support rotation of the pressing plate by being inserted into the groove, protrudes from an inner side of the dust box cover.

10. The robot cleaner of claim 9, wherein the dust box cover is rotatably coupled to the dust box body, and wherein the protrusion is inserted into the groove when the dust box cover is disposed to cover the opening of the dust box body.

11. The robot cleaner of claim 8, wherein the dust box body includes:

a first chamber communicating with the dust discharge opening; and a second chamber formed below a lower side of the first chamber, having a smaller volume than the first chamber, and provided between the first and second air guides.

12. The robot cleaner of claim 11, wherein first chamber is provided over the first and second guiding members.

13. The robot cleaner of claim 11, wherein the pressing plate includes:

a first pressing plate provided in the first chamber; and a second pressing plate extending downward from the first pressing plate, and provided in the second chamber, and wherein the second pressing plate has a smaller cross sectional area than the first pressing plate.

14. The robot cleaner of claim 1, wherein an upper side of the dust box forms upper appearance of the cleaner body.

15. The robot cleaner of claim 1, wherein the dust box is formed of a transmissive material such that collected dust inside of the dust box is visible.

* * * * *